(12) United States Patent
Griffin et al.

(10) Patent No.: US 7,096,036 B2
(45) Date of Patent: Aug. 22, 2006

(54) DUAL-MODE KEYPAD FOR A MOBILE DEVICE

(75) Inventors: Jason Griffin, Waterloo (CA); Mihal Lazaridis, Waterloo (CA); Frank Tyneski, Ktichener (CA)

(73) Assignee: Research In Motion Limited, Waterloo (CA)

( * ) Notice: Subject to any disclaimer, the term of this patent is extended or adjusted under 35 U.S.C. 154(b) by 232 days.

(21) Appl. No.: 10/658,952

(22) Filed: Sep. 10, 2003

(65) Prior Publication Data

US 2005/0054376 A1   Mar. 10, 2005

(51) Int. Cl.
*H04Q 7/20* (2006.01)

(52) U.S. Cl. .............. 455/553.1; 455/575.1; 455/425; 455/550.1; 455/575.3; 455/90.3; 455/424

(58) Field of Classification Search ......... 455/550.1, 455/553.1, 552.1, 127.4, 556.1, 556.2, 566, 455/424, 66.1, 90.3, 575.1, 425, 575.3
See application file for complete search history.

(56) References Cited

U.S. PATENT DOCUMENTS

| | | | |
|---|---|---|---|
| 6,286,064 B1 | 9/2001 | King et al. | |
| 6,437,682 B1 | 8/2002 | Vance | |
| 6,541,715 B1* | 4/2003 | Swanson | 200/5 A |
| 2005/0053225 A1* | 3/2005 | Griffin | 379/368 |

FOREIGN PATENT DOCUMENTS

| | | |
|---|---|---|
| WO | WO02/101531 A1 | 12/2002 |
| WO | WO 02/101531 A1 | 12/2002 |
| WO | WO03/056764 A2 | 7/2003 |
| WO | WO 03/056784 A2 | 7/2003 |

* cited by examiner

*Primary Examiner*—Nick Corsaro
*Assistant Examiner*—Emem Ekong
(74) *Attorney, Agent, or Firm*—Jones Day; Krishna K. Pathiyal; Robert C. Liang

(57) ABSTRACT

In accordance with the teachings described herein, systems and methods are provided for implementing a dual-mode keypad for a mobile device. The mobile device may operate in a telephony mode and a text-entry mode. The dual-mode keypad may include a plurality of dual-mode keys that each include an associated telephony character and at least one associated text-entry character. The dual-mode keys may include one or more toggle keys, with each toggle key having a plurality of associated text-entry characters and one associated telephony character. When the mobile device is in text-entry mode, the dual-mode keys may be used to input the associated text-entry characters, with the toggle keys each being operable to input a first text-entry character when a first portion of the toggle key is pressed and to input a second text-entry character when a second portion of the toggle key is pressed. When the mobile device is in telephony mode, the dual-mode keys may be used to input the associated telephony characters, with the toggle keys each being operable to input one of the associated telephony characters when any portion of the toggle key is pressed.

17 Claims, 5 Drawing Sheets

DUAL-MODE KEYPAD FOR A MOBILE DEVICE

FIELD

The technology described in this patent document relates generally to the field of input systems for electronic devices. More particularly, the patent document describes a dual-mode keypad that is especially well-suited for use in a mobile device.

BACKGROUND

Mobile devices that include a combined text-entry keypad and a telephony keypad are known in this field. Examples of such mobile devices include cellular telephones, wireless personal digital assistants (PDAs), two-way paging devices, and others. However, combining a traditional-style text-entry keypad (e.g., a QWERTY-style keypad) with a traditional-style telephony keypad on the same mobile device typically involves an ergonomic compromise between having smaller keys on a full text-entry keypad or larger keys on a reduced keypad.

SUMMARY

In accordance with the teachings described herein, systems and methods are provided for implementing a dual-mode keypad for a mobile device. The mobile device may operate in a telephony mode and a text-entry mode. The dual-mode keypad may include a plurality of dual-mode keys that each include an associated telephony character and at least one associated text-entry character. The dual-mode keys may include one or more toggle keys, with each toggle key having a plurality of associated text-entry characters and one associated telephony character. When the mobile device is in text-entry mode, the dual-mode keys may be used to input the associated text-entry characters, with the toggle keys each being operable to input a first text-entry character when a first portion of the toggle key is pressed and to input a second text-entry character when a second portion of the toggle key is pressed. When the mobile device is in telephony mode, the dual-mode keys may be used to input the associated telephony characters, with the toggle keys each being operable to input one of the associated telephony characters when any portion of the toggle key is pressed.

DETAILED DESCRIPTION

Figure 1:
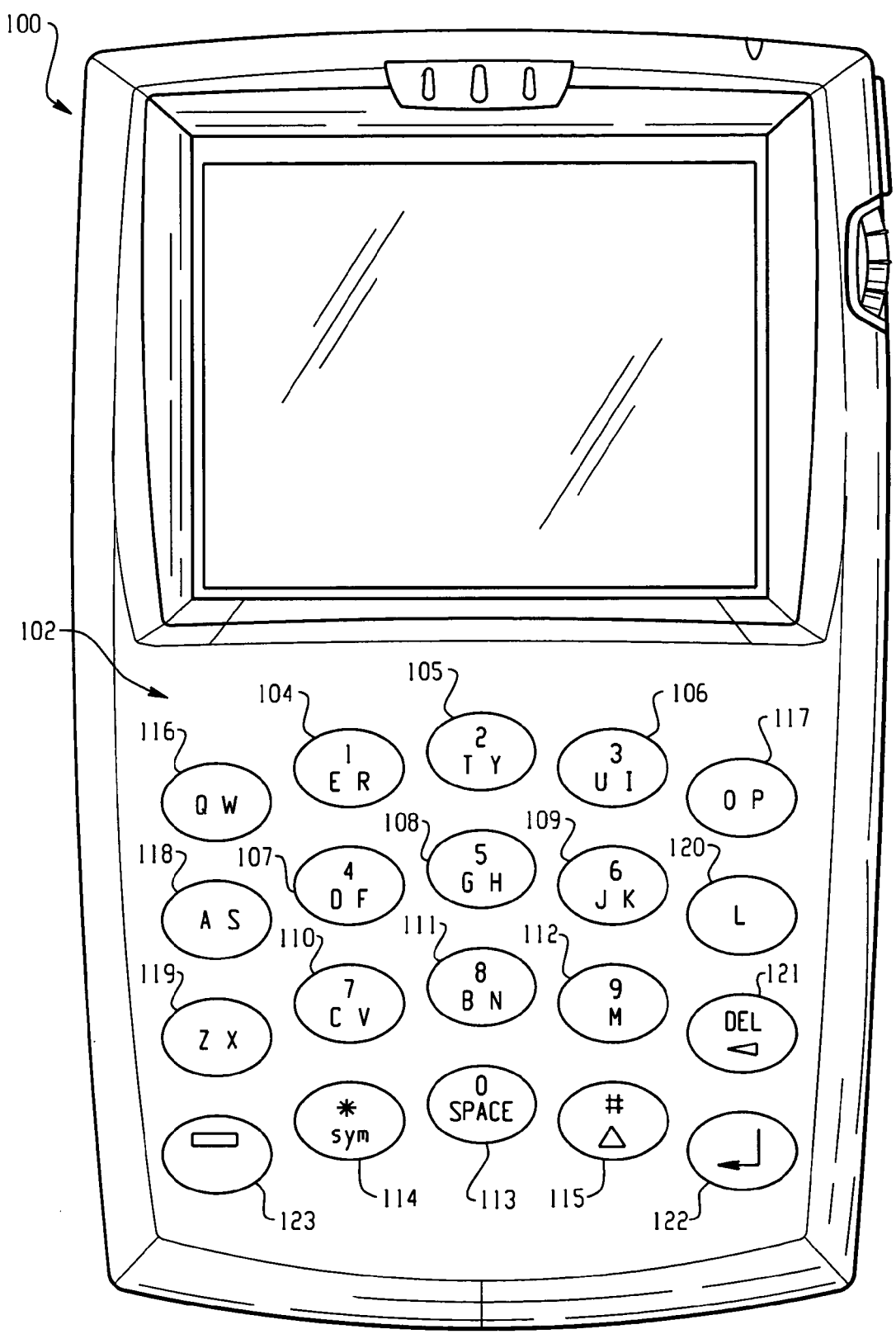
FIG. 1 is a front view of a mobile device having an example dual-mode keypad.

With reference now to the drawing figures, FIG. 1 is a front view of a mobile device 100 having an example dual-mode keypad 102. The dual-mode keypad 102 includes a plurality of dual-mode keys 104–115, a plurality of single-mode keys 116–120, and a plurality of functional keys 121–123. The dual-mode keys 104–115 each include a telephony character and at least one text-entry character. For example, dual-mode key 112 includes the telephony character "9" and the text-entry character "M." The single-mode keys 116–120 each include at least one text-entry character.

In operation, the mobile device 100 is configured to operate in a telephony mode and a text-entry mode. The telephony characters may be input when the mobile device 100 is in telephony mode, and the text-entry characters may be input when the mobile device 100 is in text-entry mode. The functional keys 121–123 may be configured to operate in both the telephony mode and the text-entry mode, or alternatively one or more of the functional keys 121–123 may be operable in only the telephony mode or the text-entry mode. In this manner, the dual-mode keypad 102 has two distinct ergonomics depending upon the mode of the mobile device 100. Preferably, the telephony characters are arranged to provide a traditional telephone keypad layout when the device 100 is in telephony mode, and the text-entry characters are arranged to provide a traditional keyboard layout (e.g., a QWERTY keyboard) when the device 100 is in text-entry mode. The text-entry characters are preferably arranged in the pattern of a QWERTY-style keyboard, but could alternatively be arranged in other keyboard patterns, such as a DVORAK style keyboard pattern, an alphabetic style keyboard pattern, a QWERTZ style keyboard pattern, an AZERTY style keyboard pattern, or others.

In addition, the keypad 102 includes a plurality of toggle keys 104–111, 116–119 that each include two associated text-entry characters. For example, toggle key 104 includes the text-entry characters "E" and "R." For each toggle key 104–111, 116–119, a first text-entry character may be input when a first portion of the key is pressed and a second text-entry character may be input when a second portion of the key is pressed. For example, if the left-hand portion of toggle key 104 is pressed (in text-entry mode), then the text-entry character "E" is input. If the right-hand portion of toggle key 104 is pressed (in text-entry mode), then the text-entry character "R" is input to the device 100. If the toggle key also includes an associated telephony character, then the telephony character may be input while in telephony mode by pressing any portion of the key. For example, if the mobile device 100 is in telephony mode, then the telephony character "1" may be input by pressing any portion of toggle key 104. Example toggle keys are described below in more detail with reference to FIGS. 3 and 4.

The mobile device 100 may also include a predictive text computer program that is used in conjunction with the dual-mode keypad 102. A predictive text computer program may, for example, be used to predict a complete word or phrase from one or more keystrokes. In addition, the predictive text computer program may operate without regard to which portion of a toggle key is pressed. For example, when any portion of the toggle key 104 is pressed, a predictive text computer program may attempt to predict a desired word or phrase that includes either the text-entry character "E" or "R." In this manner, text may be input more quickly while in text-entry mode, without requiring a user to select the proper portion of the toggle keys. If the predictive text computer program does not successfully predict a desired word or phrase, then text-entry characters may be entered more precisely, albeit more slowly, by selecting the appropriate characters on the toggle keys 104–111, 116–119. An example predictive text computer program is described in the following co-owned patent applications, which are incorporated herein by reference: "Customizable Predictive Text Method For Reduced Keyboards," U.S. Provisional Patent Application Ser. No. 60/397,680, filed Jul. 23, 2002; and "Systems and Methods of Building and Using Custom Word Lists," International Patent Application Ser. No. PCT/CA03/01103, filed Jul. 23, 2003.

Figure 2:
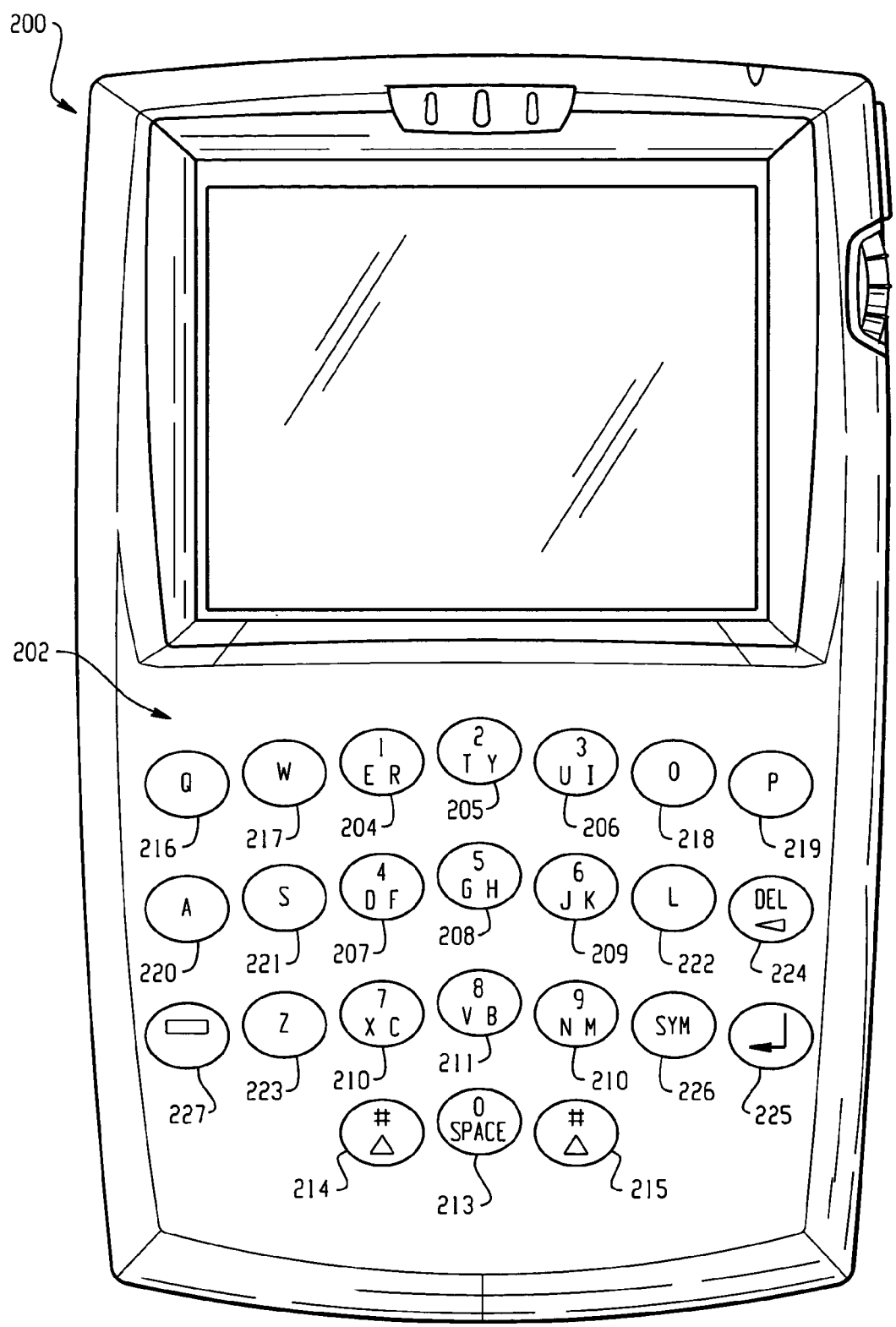
FIG. 2 is a front view of a mobile device having another example dual-mode keypad.

FIG. 2 is a front view of a mobile device 200 having one alternative example dual-mode keypad 202. This dual-mode keypad 202 is similar to the keypad 102 describrd above with reference to FIG. 1, except that only the dual-mode keys 204–215 in this example keypad 202 include toggle keys. That is, the single-mode keys 216–223 in this example each have only one associated character. In addition, the dual-mode keys 204–215 in this example keypad 202 are larger than the single-mode keys and functional keys to provide a prominent telephone keypad.

Figure 3:
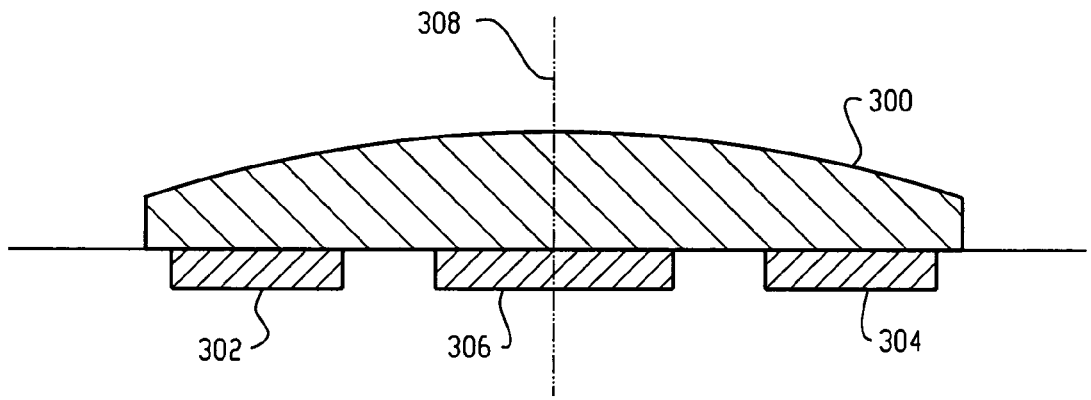
FIG. 3 is a cross-sectional view of an example toggle key having three input switches.

FIG. 3 is a cross-sectional view of an example toggle key having a button 300 and three input switches 302, 304, 306. Also shown is a vertical reference 308 that bisects the button 300 to illustrate a left-hand portion of the key and a right-hand portion of the key. In relation to the vertical reference 308, the three switches include a left-most switch 302, a right-most switch 304 and a center switch 306. The switches 302, 304, 306 may, for example, be dome switches that are engaged by pressing a portion of the button 300. The button 300 may, for example, be a rigid member that pivots at the vertical reference 308. It should be understood, however, that other types of switches and buttons may also be similarly employed.

In operation, if the button 300 is pressed to the left of the vertical reference 308, then the left-most switch 302 and the center switch 306 are engaged. If the button 300 is pressed to the right of the vertical reference 308, then the right-most switch 304 and the center switch 306 are engaged. If the center of the button 300 is pressed at the vertical reference 308, then the center switch 306 is engaged, and the left-most switch 302 and/or the right-most switch 304 may also be engaged.

As described above with reference to FIGS. 1 and 2, the toggle key 300 may have an associated telephony character and two associated text-entry characters. If the mobile device is in telephony mode, then the telephony character may be input by engaging the center switch 306. Thus, the telephony character may be input without regard to which portion of the button 300 is pressed. If the mobile device is in text-entry mode, then one of the associated text-entry characters may be input by engaging the left-most switch 302 and the other associated text-entry character may be input by engaging the right-most switch 304. Thus, the input of a particular text-entry character is dependent upon which section of the button 300 is pressed.

Figure 4:
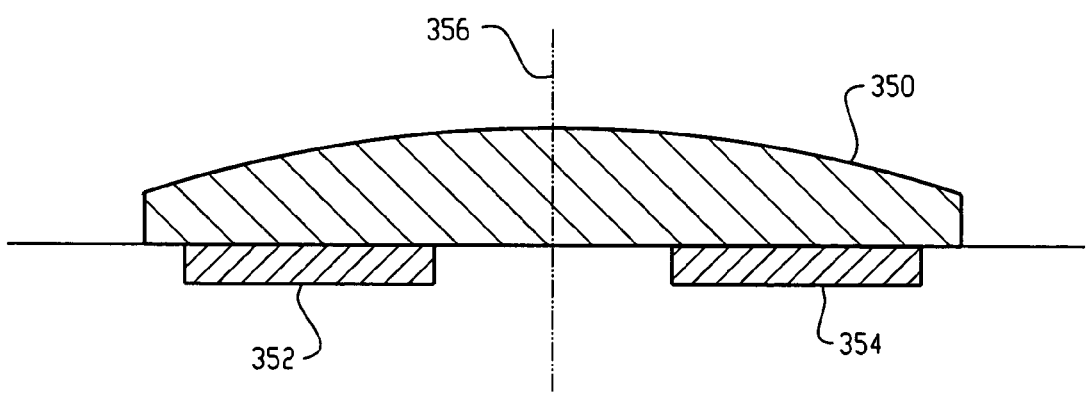
FIG. 4 is a cross-sectional view of an example toggle key having two input switches.

FIG. 4 is a cross-sectional view of an example toggle key having a button 350 and two input switches 352, 354. Also shown is a vertical reference 356 that bisects the button 350 to illustrate a left-hand portion of the key and a right-hand portion of the key. In relation to the vertical reference 356, the two switches include a left-most switch 352 and a right-most switch 354.

The toggle key 350, 352, 354 shown in FIG. 4 is similar to the toggle key described above with reference to FIG. 3, but does not include a center switch 306. Thus, if the button 350 is pressed to the right of the vertical reference 356, only the right-most switch 354 is engaged, and if the button 350 is pressed to the left of the vertical reference 356, only the left-most switch 352 is engaged. If the mobile device is in telephony mode, then an associated telephony character may be input by engaging either or both of the switches 352, 352. If the mobile device is in text-entry mode, then one associated text-entry character may be input by engaging the left-most switch 352, and another associated text-entry character may be input by engaging the right-most switch 354.

Figure 5:
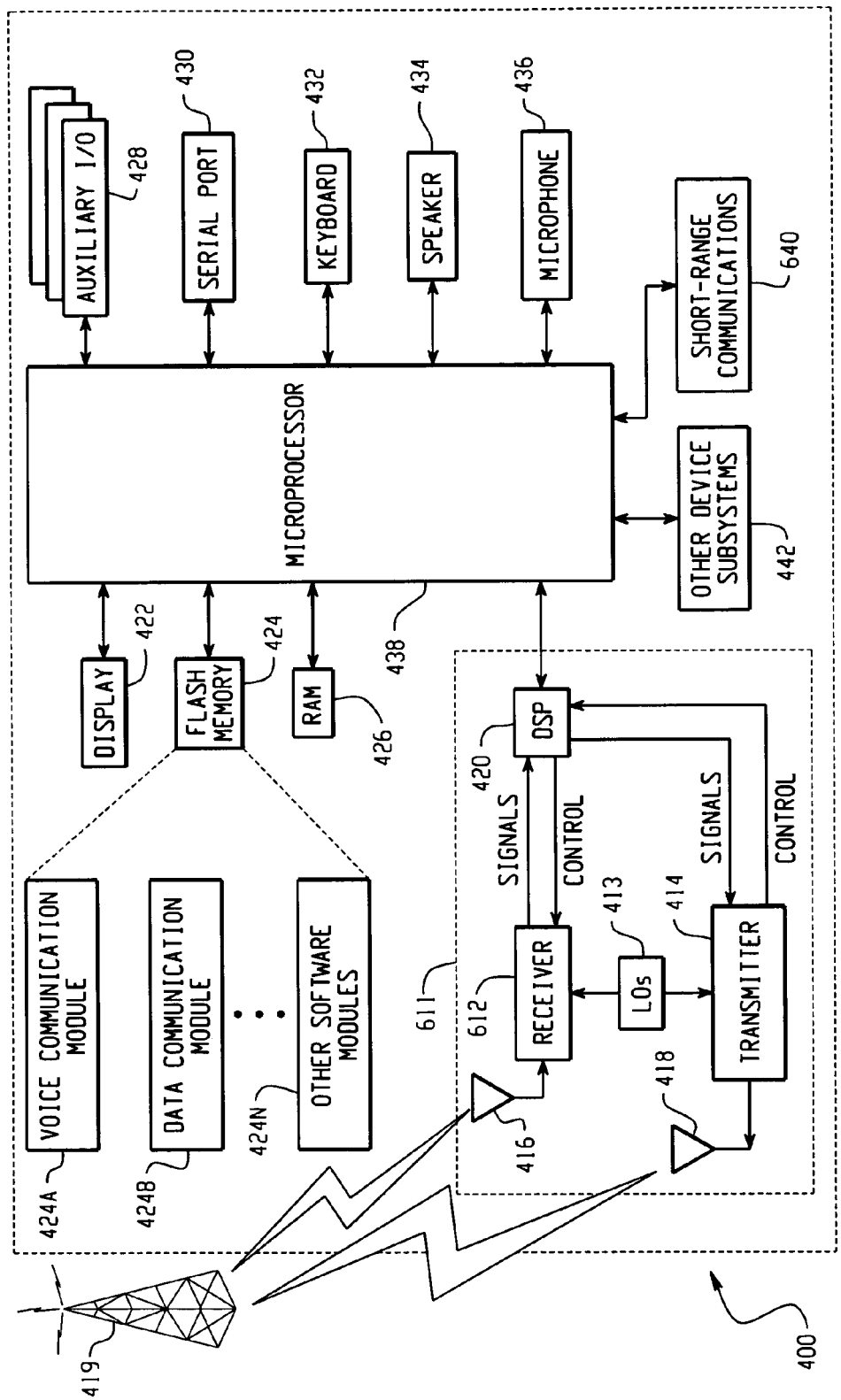
FIG. 5 is a block diagram of an example mobile device that may include a dual-mode keypad.

FIG. 5 is a block diagram of an example mobile device that may include a dual-mode keypad, as described herein. The mobile device 400 includes a processing device 438, a communications subsystem 611, a short-range communications subsystem 640, input/output devices 422, 428, 430, 432, 434, 436, memory devices 424, 426, and various other device subsystems 442. The mobile device 400 is preferably a two-way communication device having voice and data communication capabilities. In addition, the device 400 preferably has the capability to communicate with other computer systems via the Internet.

The processing device 438 controls the overall operation of the mobile device 400. Operating system software executed by the processing device 438 is preferably stored in a persistent store, such as a flash memory 424, but may also be stored in other types of memory devices, such as a read only memory (ROM) or similar storage element. In addition, system software, specific device applications, or parts thereof, may be temporarily loaded into a volatile store, such as a random access memory (RAM) 426. Communication signals received by the mobile device 400 may also be stored to RAM 426.

The processing device 438, in addition to its operating system functions, enables execution of software applications 424A–424N on the device 400. A predetermined set of applications that control basic device operations, such as data and voice communications 424A, 424B, may be installed on the device 400 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 419. Preferably, the PIM data items are seamlessly integrated, synchronized and updated via the wireless network 419 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 611, and possibly through the short-range communications subsystem 640. The communication subsystem 611 includes a receiver 612, a transmitter 414 and one or more antennas 416, 418. In addition, the communication subsystem 611 also includes a processing module, such as a digital signal processor (DSP) 420, and local oscillators (LOs) 413. The specific design and implementation of the communication subsystem 611 is dependent upon the communication network in which the mobile device 400 is intended to operate. For example, a mobile device 400 may include a communication subsystem 611 designed to operate with the Mobitex™, DataTAC™ or General Packet Radio Service (GPRS) mobile data communication networks and also designed to operated with any of a variety of voice communication networks, such as AMPS, TDMA, CDMA, PCS, GSM, etc. Other types of data and voice networks, both separate and integrated, may also be utilized with the mobile device 400.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 400 may send and receive communication signals over the communication network 419. Signals received by the antenna 416 from the communication network 419 are routed to the receiver 612, which provides for signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 419 are processed (e.g., modulated and encoded) by the DSP 420 and are then provided to the transmitter 414 for digital to analog conversion, frequency up conversion, filtering, amplification and transmission to the communication network 419 (or networks) via the antenna 418.

In addition to processing communication signals, the DSP 420 provides for receiver 612 and transmitter 414 control. For example, gains applied to communication signals in the receiver 612 and transmitter 414 may be adaptively controlled through automatic gain control algorithms implemented in the DSP 420.

In a data communication mode, a received signal, such as a text message or web page download, is processed by the communication subsystem 611 and input to the processing device 438. The received signal is then further processed by the processing device 438 for output to a display 422, or alternatively to some other auxiliary I/O device 428. A device user may also compose data items, such as e-mail messages, using a keyboard 438, such as the dual-mode keypad described above, and/or some other auxiliary I/O device 428, such as a touchpad, a rocker switch, a thumb-wheel, or some other type of input device. The composed data items may then be transmitted over the communication network 419 via the communication subsystem 611.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 400. In addition, the display 422 may also be utilized in voice communication mode, for example to display the identity of a calling party, the duration of a voice call, or other voice call related information.

The short-range communications subsystem 640 enables communication between the mobile device 400 and other proximate systems or devices, which need not necessarily be similar devices. For example, the short-range communications subsystem 640 may include an infrared device and associated circuits and components, or a Bluetooth™ communication module to provide for communication with similarly-enabled systems and devices.

Figure 6:
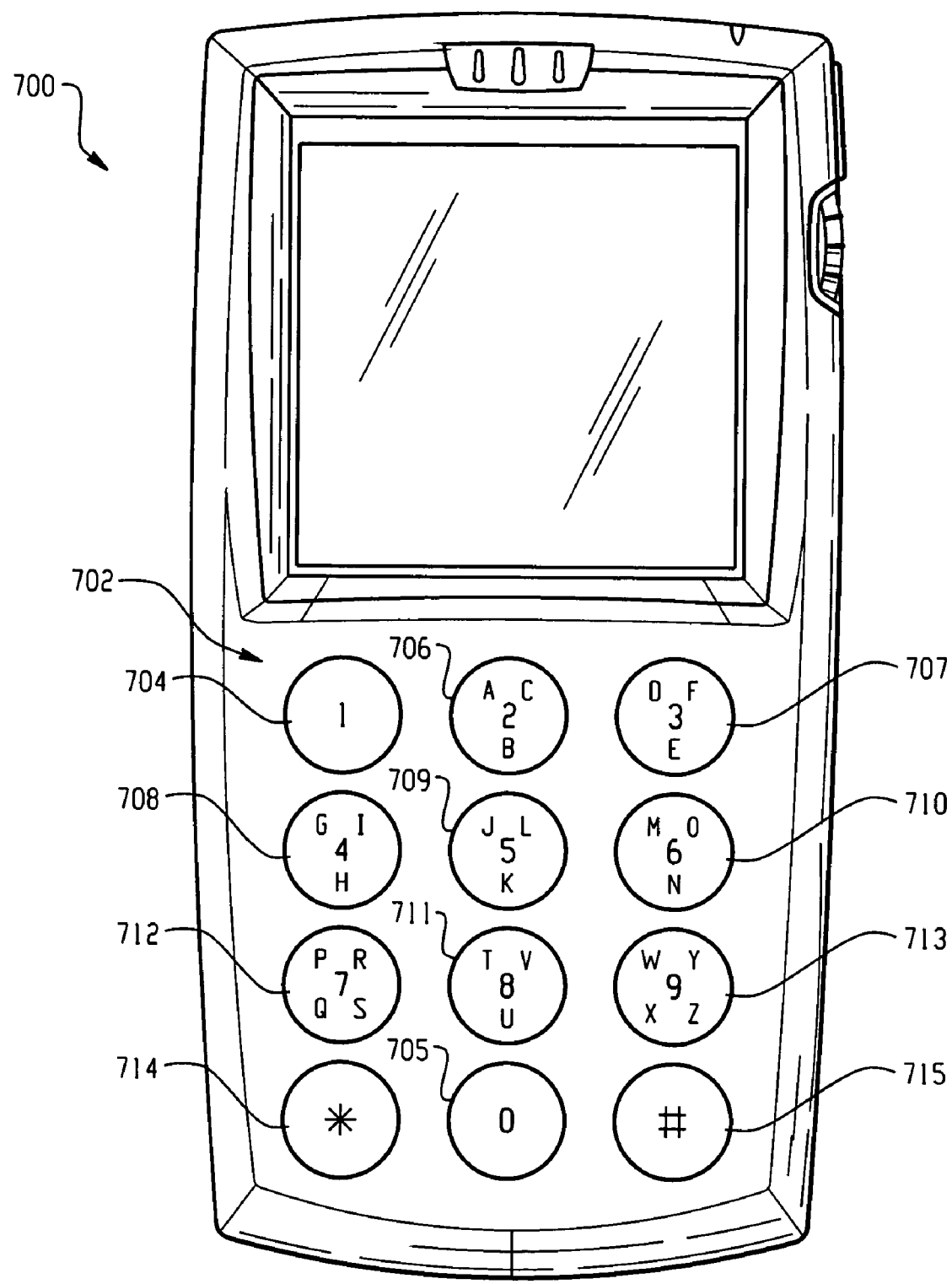
FIG. 6 is a front view of a mobile device having an example telephone-style dual-mode keypad.

FIG. 6 is a front view of an example mobile device 700 having a dual-mode keypad 702 arranged in the pattern of a typical telephony-style keypad. The dual-mode keypad 702 includes a plurality of dual-mode keys 706–713, and a plurality of single-mode keys 704, 705, 714, 715. The dual-mode keys 706–713 each include a telephony character and a plurality of text-entry characters. For example, the dual-mode key 706 includes the telephony character "2" and the text-entry characters "A," "B", and "C." The single-mode keys 704, 705, 714, 715 each include a telephony character.

In operation, the text-entry characters may be input to the mobile device 700 while the device 700 is in text-entry mode, and the telephony characters may be input while the device 700 is in telephony mode. Similar to a traditional telephony-style keypad, the dual-mode keys 706–713 each include either three or four text-entry characters. In text-entry mode, the text-entry characters may be input by pressing a corresponding portion of the dual-mode key 706–713. In telephony mode, the telephony characters may be input by pressing any portion of a dual-mode key 706–713.

The illustrated dual-mode keys 706–713 may be similar to the dual mode keys described above with reference to FIGS. 3 and 4, with an additional number of input switches to correspond with the additional number of text-entry characters on a particular key. For example, dual-mode key 706 may include an input switch for each of the three associated text-entry characters, and may also include a center input switch for inputting the telephony character. The input switches corresponding to the text-entry characters may be positioned such that they are engaged by pressing a portion of the key 706 on which the desired text-entry character is printed. The center input switch may be engaged by pressing any portion of the key 706. Alternatively, the dual mode keys 706–713 may include input switches corresponding to the text-entry characters, but no center input switch. If no center input switch is included, then the telephony character may be input while in telephony mode by engaging any one or more of the input switches.

This written description uses examples to disclose the invention, including the best mode, and also to enable a person skilled in the art to make and use the invention. The patentable scope of the invention may include other examples that occur to those skilled in the art. For example, in one alternative embodiment, a toggle key, similar to that shown in FIG. 3, may be included in which the center key provides a tactile response. The tactile response of the center key (e.g., a click) may, for example, be included to give the dual-mode keypad the feel of a typical telephony keypad. In one embodiment, the center key may provide only a tactile response and no electrical input. In this case, the toggle key may operate with two inputs, as described above with reference to FIG. 4, while the center key is included only to improve the tactile response when the key is pressed.

It is claimed:

1. A dual-mode keypad, comprising:
a plurality of dual-mode keys that each include an associated telephony character and at least one associated text-entry character, a plurality of single-mode text keys that each include an associated text-entry character, and a plurality of single-mode function keys that each include an associated function entry;
the dual-mode keys including one or more toggle keys, each toggle key having two associated text-entry characters and one associated telephony character;

the dual-mode keypad being operable in a telephony mode and a text-entry mode;

when the dual-mode keypad is operating in text-entry mode, the dual-mode keys being operable to input the associated text-entry characters, the toggle keys each being operable to input a first text-entry character when a first portion of the toggle key is pressed and to input a second text-entry character when a second portion of the toggle key is pressed;

when the dual-mode keypad is operating in telephony mode, the dual-mode keys being operable to input the associated telephony characters, the toggle keys each being operable to input one of the associated telephony characters when any portion of the toggle key is pressed;

wherein the dual-mode keys are arranged in three central columns of keys with four rows.

2. The keypad of claim 1, wherein the keypad comprises twenty-four or more keys.

3. The keypad of claim 1, wherein the keypad has an odd number of columns greater than three.

4. The keypad of claim 1, wherein the telephony characters on the dual-mode keys are arranged in a telephony-style pattern.

5. The keypad of claim 1, wherein the dual-mode keys are larger than all other keys on the keypad.

6. The keypad of claim 1, wherein the toggle keys have a plurality of switches that consist essentially of three switches.

7. The keypad of claim 1, wherein at least one of the toggle keys are operable to input a third text-entry character when a third portion of the toggle key is pressed.

8. The keypad of claim 7, wherein at least one of the toggle keys are operable to input a fourth text-entry character when a fourth portion of the toggle key is pressed.

9. The keypad of claim 1, wherein each toggle key includes a first switch that is engaged when the first portion of the toggle key is pressed and a second switch that is engaged when the second portion of the toggle key is pressed.

10. The keypad of claim 1, wherein each toggle key includes a first switch that is engaged when the first portion of the toggle key is pressed, a second switch that is engaged when the second portion of the toggle key is pressed, and a third switch that is engaged when any portion of the toggle key is pressed.

11. The keypad of claim 10, wherein the third switch provides a tactile response when any portion of the toggle key is pressed.

12. The keypad of claim 9, wherein when in telephony mode, the telephony character is input by engaging either the first switch or the second switch.

13. The keypad of claim 1, wherein the text-entry characters are arranged in a QWERTY-style keyboard pattern.

14. The keypad of claim 1, further comprising one or more functional keys that are operable in one of the telephone mode or the text-entry mode.

15. The keypad of claim 1, further comprising one or more functional keys that are operable in both the telephone mode and the text-entry mode.

16. A mobile device, comprising
a memory subsystem;
a communication subsystem;
a processing subsystem configured to store and retrieve data in the memory subsystem, to execute instructions stored in the memory subsystem, and to cause the communication subsystem to transmit and receive data over a communication network; and
a dual-mode keypad configured to input data to the processing subsystem, the dual-mode keypad comprising:
a plurality of dual-mode keys that each include an associated telephony character and at least one associated text-entry character, a plurality of single-mode text keys that each include an associated text-entry character, and a plurality of single-mode function keys that each include an associated function entry;
the dual-mode keys including one or more toggle keys, each toggle key having two associated text-entry characters and one associated telephony character;
the dual-mode keypad being operable in a telephony mode and a text-entry mode;
when the dual-mode keypad is operating in text-entry mode, the dual-mode keys being operable to input the associated text-entry characters, the toggle keys each being operable to input a first text-entry character when a first portion of the toggle key is pressed and to input a second text-entry character when a second portion of the toggle key is pressed;
when the dual-mode keypad is operating in telephony mode, the dual-mode keys being operable to input the associated telephony characters, the toggle keys each being operable to input one of the associated telephony characters when any portion of the toggle key is pressed;
wherein the dual-mode keys are arranged in three central columns of keys with four rows.

17. The mobile device of claim 16, further comprising:
executable predictive text program code stored in the memory subsystem and comprising instructions operable to cause the mobile device to predict a complete word or phrase from one or more text-entry characters input to the mobile device when the mobile device is in text-entry mode.

* * * * *